US012580408B2

(12) United States Patent
Hanley et al.

(10) Patent No.: US 12,580,408 B2
(45) Date of Patent: Mar. 17, 2026

(54) VOLTAGE BOOST CIRCUITRY FOR RADIO SYSTEMS

(71) Applicant: Outdoor Wireless Networks LLC, Claremont, NC (US)

(72) Inventors: John T. Hanley, Orland Park, IL (US); Charles John Mann, Omaha, NE (US); Mankun Li, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 179 days.

(21) Appl. No.: 18/549,563

(22) PCT Filed: Mar. 12, 2021

(86) PCT No.: PCT/CN2021/080381
§ 371 (c)(1),
(2) Date: Sep. 7, 2023

(87) PCT Pub. No.: WO2022/188131
PCT Pub. Date: Sep. 15, 2022

(65) Prior Publication Data
US 2024/0170991 A1     May 23, 2024

(51) Int. Cl.
*H02J 7/00*     (2006.01)
*H02M 3/155*     (2006.01)

(52) U.S. Cl.
CPC ......... *H02J 7/00712* (2020.01); *H02M 3/155* (2013.01)

(58) Field of Classification Search
CPC ...... H02J 9/04; H02J 9/06; H02J 6/061; H02J 7/34; H02J 7/356; H02J 9/068
See application file for complete search history.

(56) References Cited

U.S. PATENT DOCUMENTS

| | | | |
|---|---|---|---|
| 9,448,576 B2 | 9/2016 | Chamberlain et al. | |
| 10,727,740 B1 | 7/2020 | Fischer | |
| 10,812,664 B2 | 10/2020 | Kostakis et al. | |
| 11,129,095 B2 | 9/2021 | Gandhi | |
| 2019/0214845 A1* | 7/2019 | Hausman, Jr. .......... | H02J 9/061 |
| 2020/0212802 A1* | 7/2020 | Chang ..................... | G06F 1/263 |
| 2020/0228001 A1 | 7/2020 | Lambert et al. | |
| 2024/0106326 A1* | 3/2024 | Rabello ................. | H02M 1/327 |

FOREIGN PATENT DOCUMENTS

| | | |
|---|---|---|
| CN | 201352761 Y | 11/2009 |
| CN | 102439835 A | 5/2012 |
| CN | 104539042 A | 4/2015 |

(Continued)

OTHER PUBLICATIONS

Electronics & Wireless World, "Power Supply Development from a Telecom Standpoint", Oct. 1, 1988, vol. 94, No. 1632, pp. 1018 through 1021, XP 00005150, Reed Business Publishing, Sutton, Surrey, GB.

(Continued)

*Primary Examiner* — Rexford N Barnie
*Assistant Examiner* — Terrence R Willoughby
(74) *Attorney, Agent, or Firm* — Fogg & Powers LLC

(57) ABSTRACT
Techniques for utilizing voltage boost circuitry are disclosed. The voltage boost circuitry is used when DC power is provided from at least one battery.

12 Claims, 5 Drawing Sheets

(56) References Cited

FOREIGN PATENT DOCUMENTS

| | | |
|---|---|---|
| WO | 2021017563 A1 | 2/2021 |
| WO | 2022188131 A1 | 9/2022 |

OTHER PUBLICATIONS

European Patent Office, "Extended European Search Report", dated Nov. 6, 2024, from EP Application No. 2192609.2, from Foreign Counterpart to U.S. Appl. No. 18/549,563, pp. 1 through 8, Published: EP.

International Searching Authority, "International Search Report and Written Opinion", from PCT Application No. PCT/CN2021/ 080381, Dec. 8, 2021, pp. 1 through 9, Published in: WO.

* cited by examiner

VOLTAGE BOOST CIRCUITRY FOR RADIO SYSTEMS

This application is a U.S. National Stage Application of International Patent Application No. PCT/CN2021/080381, filed on Mar. 12, 2021, and titled "VOLTAGE BOOST CIRCUITRY FOR RADIO SYSTEMS", the contents of which are incorporated herein by reference.

BACKGROUND

Demand for increased wireless communication has consequently increased the need for faster and more reliable communications technologies. Cellular communications are no exception: whereas traditional cellular communication systems installed both baseband and radio equipment at the bottom of a cell tower, contemporary systems now have the radio equipment installed at the top of a cell tower. In these systems, a cable delivers direct current (DC) electrical power from a DC power source to the radio equipment to power the radio equipment so that it can function at the top of the tower.

Cell towers can vary widely in height, but typically extend more than two hundred feet tall. Demand for more sophisticated communications technology, such as 5G technology, and increased amounts of data transmitted by the radio equipment have also resulted in a higher DC power consumption by radio equipment. As a result, these systems require cables having significant length and delivering high amounts of DC power to the radio equipment at the top of the cell tower. In delivering power to the radio equipment, the resistance of the cable causes a voltage drop proportional to the current drawn through the cable, and a dissipative power loss in the cable proportional to the square of the current. If the voltage drop results in a DC voltage at the input of the radio equipment that is below a minimum voltage level required for the radio equipment to operate, the radio equipment becomes non-operational and causes undesirable loss of service to wireless operators utilizing the cellular communication system.

The DC power source often includes a backup power source, for example at least one battery, to provide DC power in the event a primary power source fails, e.g., due to electrical blackouts and brown outs.

A battery has a finite amount of stored charge. Further, the battery voltage diminishes as battery charge is depleted. If the battery voltage drops below a certain voltage level, the voltage at the DC voltage at the input of the radio equipment falls below the minimum voltage level required for the radio equipment to operate. The power dissipated in the cable undesirably accelerates battery voltage decline.

SUMMARY

In one embodiment, a system is provided. The system comprises input conductors configured to receive an input direct current (DC) voltage from one of a non-battery DC power source and at least one battery. The system further comprises output conductors configured to provide an output DC voltage to a first end of a power cable electrically coupled to a radio. The system further comprises processing circuitry coupled to the input conductors. The system further comprises voltage boost circuitry electrically coupled to the input conductors and configured to generate a boosted DC voltage from the received DC voltage. The system further comprises first switch circuitry electrically coupled to the voltage boost circuitry. In a first configuration of the first switch circuitry an unboosted DC voltage is provided at the output conductors, wherein the unboosted voltage is substantially equal to the input DC voltage. In a second configuration of the first switch circuitry the boosted DC voltage is provided at the output conductors. The processing circuitry is further configured to receive a signal indicative of whether the input DC voltage received by the input conductors is from the at least one battery or is from the non-battery DC power source. The processing circuitry is further configured to configure the first switch circuitry in the first configuration when the signal indicates that the input DC voltage is from the non-battery DC power source, and to configure the first switch circuitry in the second configuration when the input DC voltage is from the at least one battery.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
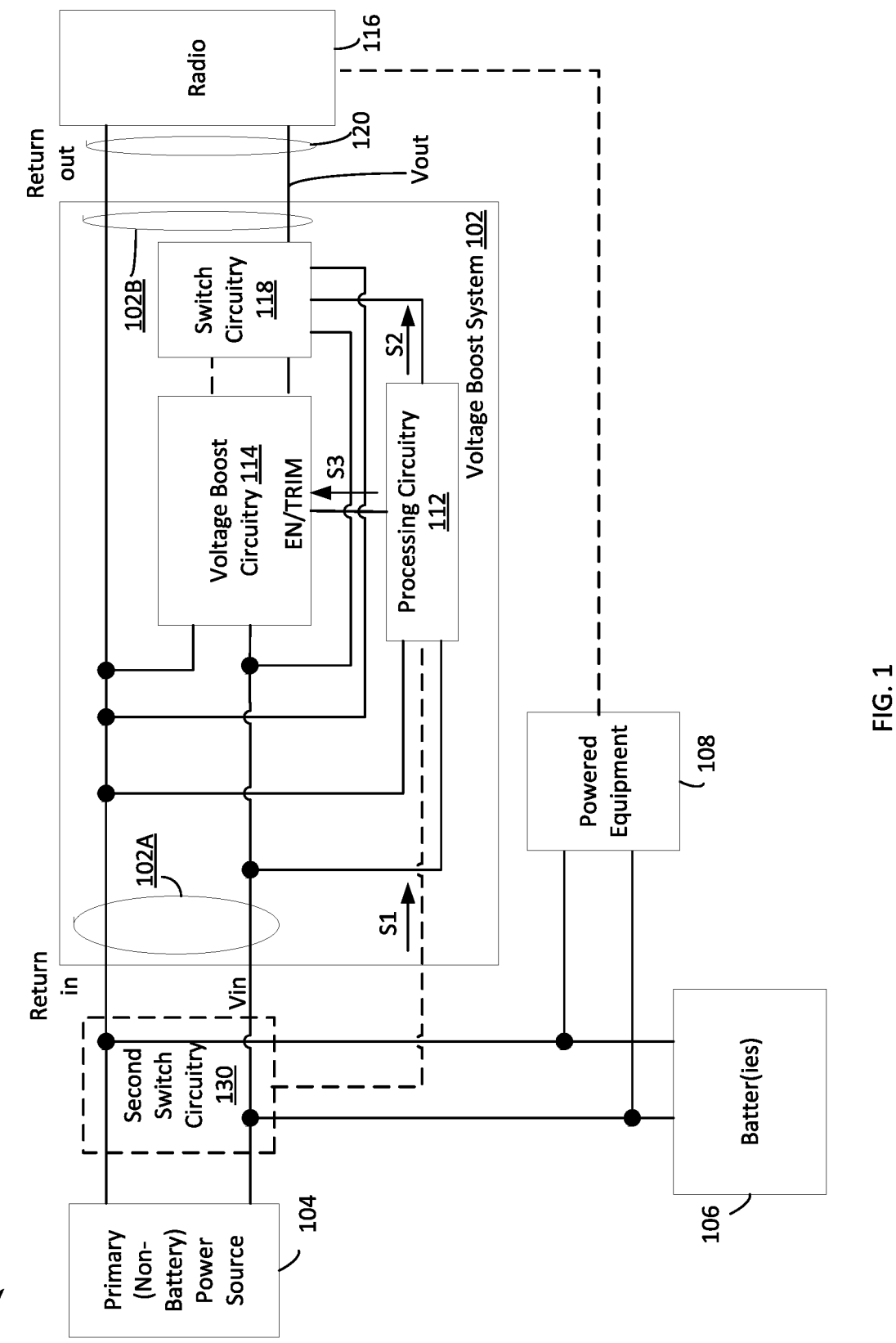
FIG. 1 illustrates a block diagram of one embodiment of a voltage boost system configured to provide a boosted DC voltage when the voltage boost system receives DC voltage from a battery.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

When at least one battery is used to provide DC power to a radio system, boosting the DC voltage of the at least one battery reduces current drawn from the at least one battery through the cable by the radio, and hence beneficially reduces both the voltage drop and power dissipation in the cable. As a result, battery charge dissipation is reduced, and battery lifetime is extended.

Voltage boosting circuitry is not perfectly efficient. A finite power is dissipated by such voltage boosting circuitry.

Optionally, the power dissipated may range from one to five percent of DC power supplied to the voltage boosting circuitry. Although voltage boosting circuitry has been suggested for use when using a primary power source, e.g., a non-battery power source (for example an AC/DC power supply), the inefficiencies of the voltage boosting circuitry may be substantially equal to or even greater than a cable power dissipation reduction produced from the boosted DC voltage provided by the voltage boosting circuitry.

Techniques are described herein for boosting a DC voltage only when DC power is provided from at least one battery (batter(ies)). The embodiments described herein extend time during which the batter(ies) can provide useable power to a radio system. As a result, fewer or smaller batter(ies) may be used and/or life of the batter(ies) is extended (and the batter(ies) may be replaced less often). Thus, radio system cost is diminished.

FIG. 1 illustrates a block diagram of one embodiment of a system 100 including voltage boost system configured to provide a boosted DC voltage when the voltage boost system receives DC voltage from batter(ies). The system 100 includes a non-battery power source 104 that generates DC voltage but that does not generate DC power using a batter(ies). For pedagogical explanation, primary power source (or non-battery power supply) 104 is described as an alternating current (AC) to DC (AC/DC) power supply, but may alternatively be or include other types of non-battery DC power sources such as solar cells. System 100 further includes at least one battery (batter(ies)) 106, powered equipment 108, a voltage boost system (voltage boost system circuitry) 102, and a radio 116.

The radio 116 may be a remote radio head (RRH), an active antenna unit (AAU), a remote antenna unit (RAU), or any other type of radio. DC power is electrically coupled from the voltage boost system 102 to the radio 116 through a power cable 120. The powered equipment 108 is electrical equipment, cooling equipment, etc., geographically proximate to the AC/DC power supply and/or the batter(ies) and not geographically proximate to the radio 116. Optionally, the AC/DC power supply 104, batter(ies) 106, and powered equipment 108 may reside in a common enclosure. The powered equipment 108 is electrically powered by the AC/DC power supply and/or the batter(ies) 106.

The powered equipment 108 can be configured to receive DC voltage from AC/DC power supply 104 and/or batter(ies) 106 on a separate bus than that of voltage boost system 102. In this dual-bus configuration, AC/DC power supply 104 and/or batter(ies) 106 can provide DC voltage to both voltage boost system and powered equipment 108. Powered equipment 108 is configured to distribute power to other devices or systems within radio system 100 except for radio 116. In some embodiments, powered equipment 108 can include a baseband unit (BBU) and optionally cooling equipment. In some embodiments, powered equipment 108 is located in the same enclosure or proximate to voltage boost system 102 at the base of the cell tower. A dual-bus configuration, particularly one in which aggregates powered equipment 108 in the same enclosure, reduces the space occupied by radio system 100, which provides an advantage in radio systems with limited free space. Additionally, the multi-bus configuration can reduce circuit complexity by distributing DC voltage in a centralized fashion rather than through independent power systems.

The voltage boost system 102 comprises voltage boost circuitry 114, processing circuitry 112, switch circuitry 118, input conductors 102A, and output conductors 102B. Optionally, the voltage boost circuitry 114 may be implemented by DC-DC boost converter circuitry or DC-DC buck boost converter circuitry. In some embodiments, voltage boost circuitry 114 is configured to generate a predetermined boost voltage, for example, by generating a voltage level of −6 VDC in addition to the input voltage received by the batter(ies) 106. Optionally, the processing circuitry 112 is configured to store and provide data (indicative of a predetermined boost voltage configured to be provided at output conductors 102B of the voltage boost system 102, e.g., at the output of the voltage boost circuitry 114) to the voltage boost circuitry 114. For example, if the batter(ies) 106 provide a −48 VDC voltage, the voltage boost circuitry 114 generates a boosted output voltage of −54 VDC. In other embodiments, voltage boost circuitry 114 is configured to generate a varied output voltage dependent upon the resistance and current through the output conductors 102B (and thus through the power cable 120). For example, processing circuitry 112 may include resistance measuring circuitry and current measuring circuitry (not shown in FIG. 1) to measure the current and resistance of power cable 120. Optionally, the resistance of the power cable 120 may be provided by a user or another system or otherwise determined by the processing circuitry 112, and stored in the processing circuitry 112. In this embodiment, the processing circuitry 112 is further configured to determine the output voltage of the voltage boost system 102 based on the current measurement, the resistance, and a voltage associated with the DC input of the radio (e.g., a minimum, a maximum, a nominal, or a desired radio input DC operating voltage), and communicates the determined output voltage to the voltage boost circuitry 114. Accordingly, processing circuitry 112 can dynamically adjust the DC voltage output generated by voltage boost circuitry 114 as the current drawn by the power cable 120 changes. For purposes of clarity, optionally, the voltage boost circuitry 114 may provide a voltage at its output that is equal to the voltage provided by the batter(ies) 106. When the voltage boost system 102 boosts the voltage provided by the batter(ies) 106, the current drawn from the batteries through the power cable 120 is diminished, and life of the batter(ies) 106 is extended.

The voltage boost provided by voltage boost circuitry 114 can depend on other factors as well. In one embodiment, voltage boost circuitry 114 is configured to generate a boosted DC voltage that does not result in a DC voltage level at a DC voltage input of the radio 116 in excess of the maximum DC input voltage limit of radio 116. The maximum DC input voltage limit of the radio 116 can be considered a priori during installation and stored in the processing system 112 so that voltage boost circuitry 114 generates a voltage at its output that does not exceed the maximum DC input voltage limit. If the DC voltage provided at the DC input of the radio 116 exceeds the maximum DC input voltage limit, then the radio 116 may be damaged. When the voltage boost circuitry 114 generates a fixed, predetermined or a dynamic boost voltage, the output voltage of the voltage boost system 102 can be limited so that the voltage at the DC input of the radio 116 does not exceed a voltage level that is less than the maximum DC input voltage limit by an offset voltage, where the offset voltage may be any voltage equal to or greater than zero.

The processing circuitry 112 is electrically coupled to the input conductors 102A, the voltage boost circuitry 114, and the switch circuitry 118. The processing circuitry 112 is configured to detect whether the DC power is being supplied by the batter(ies) 106 or the AC/DC power supply 104, and to change a setting of the switch circuitry 118 so that respectively either the AC/DC power supply 104 is electrically coupled to the output conductors 102B or an output of the voltage boost circuitry 114 is electrically coupled to the output conductors 102B. Optionally, the processing circuitry 112 is configured to determine whether the primary DC power source or the batter(ies) 106 are providing DC power by measuring a voltage across the input conductors 102A; in such a case, optionally, the processing circuitry 112 comprises voltage measurement circuitry coupled to the input conductors 102A and configured measure the voltage across the input conductors 102A. Optionally, the processing circuitry 112 is further configured to power up and power down the voltage boost circuitry 114, and/or to set an output voltage of the voltage boost circuitry 114. Optionally, the processing circuitry 112 can power down the voltage boost circuitry when the DC power is provided from the AC/DC power supply 104, and thus not the batter(ies) 106.

System 100 can be a radio system that communicates radio frequency (RF) signals to user equipment (UE). For pedagogical purposes, the system 100 shall be hereinafter referred to as a radio system. The radio system can be part of various types of radio networks, such as a radio access network (RAN) or other types of radio networks. A radio network may be a cellular base station or a fixed wireless access radio station. The radio network is configured to facilitate wireless communications with user equipment (UE) and/or consumer premises equipment (CPE). A radio network comprises at least one radio system.

The AC/DC power supply 104 generates a direct current (DC) voltage from a received alternating current (AC) voltage. The AC/DC power supply 104 may also be referred to as a rectifier. In the embodiment shown in FIG. 1, the AC/DC power supply 104 acts as the primary or main source of DC power in the system 100, and may be configured to generate a predetermined voltage that is received at an input of the voltage boost system 102. For example, in an embodiment AC/DC power supply is configured to generate a voltage of −54 VDC. However, other voltages may be supplied, such as −48 VDC.

Many radio systems implement positive ground systems wherein the voltage supplied is defined as a negative voltage; that is, with reference to a ground defined as 0V. The ground may further be referenced as a "return" or "common". When considering the DC voltage adjustment in system 100 and in other embodiments described herein, words such as a "higher DC voltage", "greater DC voltage", "increased DC voltage", or analogous terms, mean a DC voltage that has a greater absolute value from ground, regardless of whether the voltage supplied is positive or negative. This means that a DC voltage of +52 VDC is greater than a DC voltage of −40 VDC, but also that a voltage of −52 VDC is greater than a DC voltage of −40 VDC because the absolute value of −52 is greater than the absolute value of −40. DC voltage will be expressed as negative throughout the disclosure for pedagogical reasons understanding that positive values also fall within the scope of the disclosure.

Voltage boost system 102 includes input conductors 102A configured to receive DC voltage from AC/DC power supply 104, and/or battery 106. Voltage boost system 102 further includes output conductors 102B configured to output DC voltage to a first end of power cable 120. The voltage boost system 102 can comprise any device or circuitry configured to generate a boost DC voltage from a received voltage input.

Depending on various circumstances, AC/DC power supply 104 may output a reduced DC voltage. For example, during sudden blackout events, AC/DC power supply 104 stops providing any power. In other circumstances, e.g., during a brownout, the AC/DC power supply 104 generates reduced DC voltage that after a given set of time falls below a minimum necessary limit for system 100 to remain functional. When AC/DC power supply 104 generates reduced DC voltage, the current drawn by power cable 120 increases when DC power consumed by radio 116 remains constant. When the DC voltage supplied by AC/DC power supply 104 drops to critical levels, e.g., levels that may cause damage or render it inoperable, it may preemptively shut down for a temporary period of time. Ordinarily, shutting down AC/DC power supply 104 would cut off DC voltage to the rest of system 100; that is, through voltage boost system 102, radio 116, and powered equipment 108, and thus render system 100 inoperable until AC/DC power supply 104 can generate sufficient voltage.

To prevent shutdown of the radio 116, the batter(ies) 106 electrically coupled to the AC/DC power supply 104 in parallel are configured to generate a suitable DC voltage when AC/DC power supply 104 fails to supply at least a threshold voltage level. Put another way, battery 106 is configured to provide a DC voltage to voltage boost system 102 when AC/DC power supply 104 output voltage falls below the threshold voltage level (for example, a voltage level that results in a voltage provided at the DC power input of the radio 116 that is at least the minimum operating voltage required by the radio 116 for the radio 116 to operate). Optionally, the batter(ies) 106 have a −48 V voltage when fully charged. For purposes of clarity, because a voltage can be characterized as current measured through a resistor of known resistance, measurements may be of current (rather than a voltage as described herein) and a threshold level may be a current threshold level (rather than a voltage threshold level as described herein); voltage measurements and voltage threshold levels are illustrated herein for pedagogical purposes.

Thus, the switch circuitry 118 is configured so that in one configuration (e.g., a first configuration) voltage boost system 102 outputs the DC voltage (from the AC/DC power supply 104) that is not boosted by voltage boost circuitry 114 (an unboosted voltage), while in another configuration (e.g., a second configuration) voltage boost system 102 outputs the boosted voltage. Unboosted voltage means a voltage equal to the input DC voltage provided to the input conductors 102A less any losses in coupling the input DC voltage through switch circuitry, conductors, and any other components of the voltage boost system 102; the unboosted voltage is substantially equal to the input DC voltage. Optionally, the output voltage at the output conductors 102B of voltage boost system 102 (unboosted or boosted) should deliver a voltage at the DC input of the radio 116 that is above a minimum voltage level necessary for operation of radio 116 (accounting for a voltage drop in the power cable 116) and/or below a maximum voltage level of the radio 116.

The first configuration enables voltage boost system 102 to output the voltage received from AC/DC power supply 104 when the AC/DC power supply 104 provides sufficient voltage to radio 116. This can be accomplished via threshold comparison. For example, processing circuitry 112 can be configured to detect (e.g., via voltage measuring circuitry or a received signal) whether the voltage at the input conductors 102A of voltage boost system 102 is below a threshold voltage level. If not, processing circuitry 112 determines that the DC voltage is provided by the main power source AC/DC power supply 104 and thus configures switch circuitry 118 in the first configuration.

But, when the input voltage falls below the threshold voltage level, (when the switch circuitry is in the first configuration) then the DC voltage is provided by AC/DC power supply 104 is insufficient. Accordingly, processing circuitry 112 configures switch circuitry 118 to operate in the second configuration so that voltage boost system 102 outputs the boosted DC voltage generated by voltage boost circuitry 114, where the voltage boost circuitry 114 is powered by batter(ies).

Figure 2:
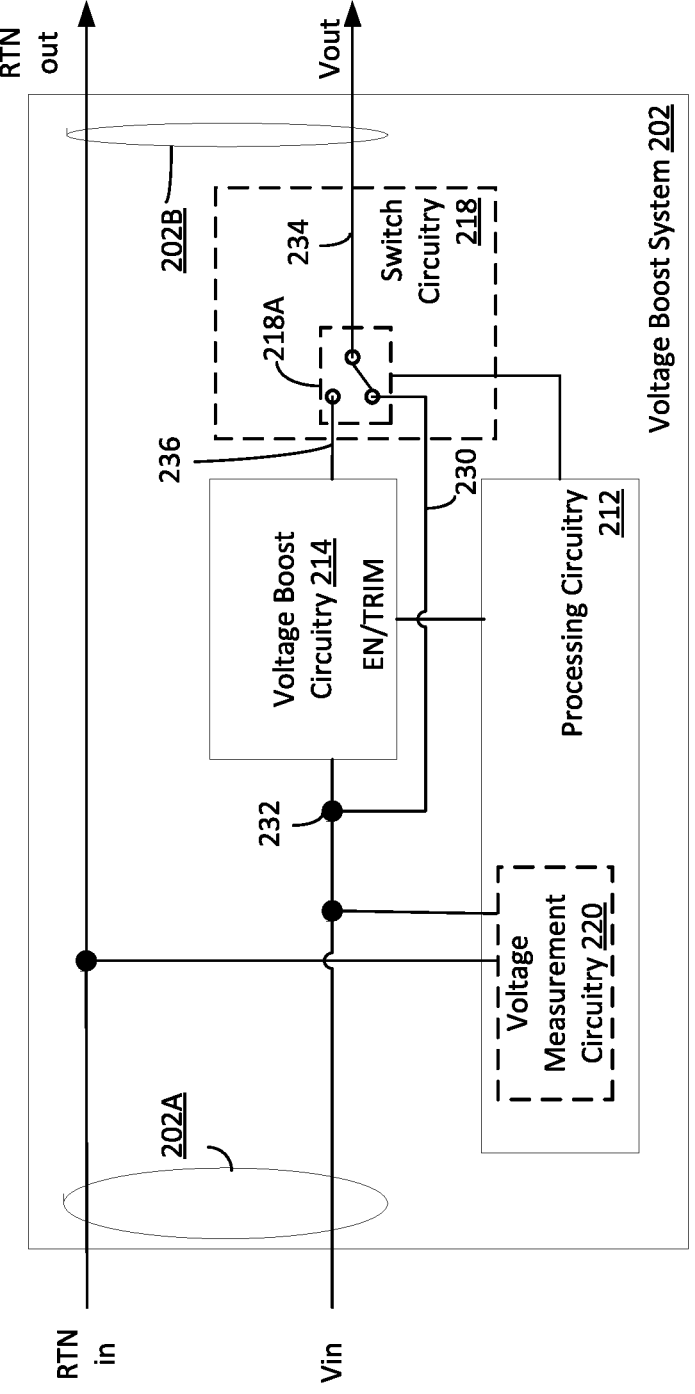
FIG. 2 illustrates a block diagram of one embodiment of a voltage boost system including a single pole double throw (SPDT) switch and voltage measurement circuitry configured to measure an input DC voltage of the voltage boost system.
Figure 3:
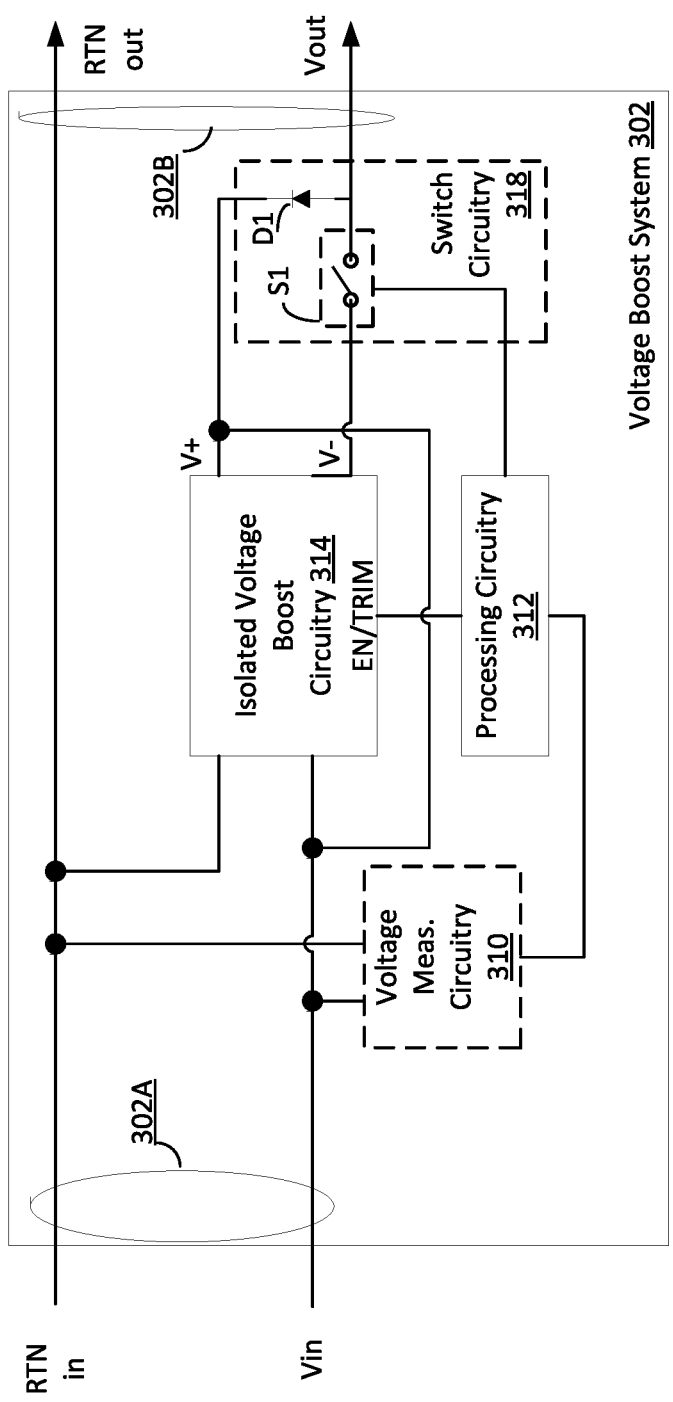
FIG. 3 illustrates a block diagram of one embodiment of a voltage boost system in which the switch circuitry includes a single pole single throw (SPST) switch and a diode.

Switch circuitry 118 includes any suitable switches and switching circuitry or combination thereof configured to switch between the first and second configurations. This may include (but not limited to): single pole single throw (SPST), single pole double throw (SPDT), and double pole double throw (DPDT) switches. The switch circuitry may be implemented by field effect transistor (FET) switch(es) and/or other transistor type(s), switch array(s), diode(s), and/or other circuit element(s). Some exemplary representations of switch circuitry 118 are illustrated in FIGS. 2-3, though switch circuitry 118 can be implemented other ways as well.

As shown in system 100 and as described above, processing circuitry 112 is coupled to voltage boost circuitry 114 and switch circuitry 118. Processing circuitry 112 may include any one or combination of processors, microprocessors, digital signal processors, application specific integrated circuits, field programmable gate arrays, and/or other similar variants thereof. Processing circuitry 112 may also include, or function with, software programs, firmware, or other computer readable instructions for carrying out various process tasks, calculations, and control functions, used in the methods described below. These instructions are typically tangibly embodied on any storage media (or computer readable media) used for storage of computer readable instructions or data structures, and can include any available storage media (or computer readable medium) that can be accessed by a general purpose or special purpose computer or processor, or any programmable logic device. Suitable computer readable media may include storage or memory media such as semiconductor, magnetic, and/or optical media, and may be embodied as storing instructions in non-transitory computer readable media, such as random access memory (RAM), read-only memory (ROM), non-volatile RAM, electrically-erasable programmable ROM, flash memory, or other storage media. The memory may also include one or more databases to store acquired data.

Optionally, the processing circuitry 112 may include voltage measurement circuitry to measure the input voltage at the input of voltage boost system 102. Alternatively, the voltage measurement circuitry is embodied as a separate unit that is coupled to processing circuitry 112 and configured to send voltage measurements to the processing circuitry (such as the embodiments shown in FIGS. 2-3). Optionally, the voltage measurement circuitry is configured to measure a voltage at output conductors 102B so that the output voltage can be adjusted (e.g. by adjusting the boosted voltage level at the output conductors 102B). Using the input voltage measurements, processing circuitry 112 determines whether the input voltage is provided by the main power source (e.g., AC/DC power supply 104) or batter(ies) 106. For example, processing circuitry 112 can compare the input voltage measurements to a threshold voltage level, as described above. If the input voltage measurements are below the threshold voltage level, then processing circuitry 112 configures switch circuitry 118 to provide the boosted voltage output to power cable 120.

Optionally, the processing circuitry 112 can further activate or deactivate voltage boost circuitry 114 based on whether the input voltage measurements are below the threshold voltage level. If processing circuitry 112 determines that the input voltage measurements are below the threshold voltage level, the processing circuitry 112 can activate voltage boost circuitry 114 to boost the input voltage (e.g., about when the switch circuitry 118 is configured to be set in the second configuration from the first configuration). However, if processing circuitry 112 determines that the input voltage measurements later reach sufficient levels (e.g., the measurements are above the threshold voltage level), then processing circuitry 112 can optionally deactivate (e.g., cease powering or alternatively disable voltage boost functionality) voltage boost circuitry 114 to stop boosting the input voltage (e.g., about when the switch circuitry 118 is configured to be set to the first configuration from the second configuration). Therefore, voltage boost circuitry 114 can be active only when needed instead of constantly boosting the DC voltage even when such boosting would be unnecessary and inefficient because the output conductors 102B are not electrically coupled to the radio 116. In controlling voltage boost circuitry 114 to be active only when required (that is, only when needed to boost the DC voltage to power cable 120), system 100 can implement voltage boost circuitry while reducing the costs that are incurred through utilizing voltage boost functionality. Optionally, processing circuitry 112 configures voltage boost circuitry 114 in a standby-by mode (e.g., a low-power mode) rather than deactivating voltage boost circuitry 114 when the input voltage measurements are above the voltage threshold level.

The voltage threshold level is used to determine whether voltage boost circuitry 114 generates a boosted DC voltage is determined based on the input voltage provided by the AC/DC power supply 104 and batter(ies) 106. In some embodiments, the DC voltage provided from AC/DC power supply 104 differs from the DC voltage provided by batter(ies) 106. In some embodiments, AC/DC power supply 104 generates a higher DC voltage than batter(ies) 106, in which case the threshold should be set at a value below the voltage provided by AC/DC power supply 104. For example, AC/DC power supply 104 may provide a voltage of −54 VDC, which for pedagogical reasons is assumed to provide a voltage at the DC input of the radio 116 even when the radio 116 is drawing maximum current (and thus there is a maximum voltage drop in the power cable 120). At some point AC/DC power supply 104 is unable to provide sufficient output voltage, in which case the batter(ies) 106 are configured to provide power, through the voltage boost system 102, to the radio. Optionally, the batter(ies) 106 provides −52 VDC to voltage boost system 102. Thus, using the foregoing examples of AC/DC power supply 104 and batter(ies) 106 output voltage, the threshold voltage level can be set between −54 VDC and −52 VDC since a voltage below −54 VDC signifies that the input voltage is not provided by AC/DC power supply 104, but instead by batter(ies) 106. Alternatively, batter(ies) 106 can provide the same DC voltage as AC/DC power supply 104 (in this example, −54 VDC), but after some period of time the voltage drops to a lower voltage (e.g., −50 VDC) as batter(ies) 106 loses charge. In this case, the threshold voltage level can be set to a value of −50 VDC to compensate for when batter(ies) 106 loses too much charge. Designating the threshold as described above enables voltage boost system 102 to determine when DC voltage is provided by batter(ies) 106 instead of AC/DC power supply 104 and boost the DC voltage to compensate for reduced input voltage.

In some embodiments, the input voltage measurements may be compared with multiple thresholds, such as a first voltage level threshold and a second voltage level threshold, to diminish, e.g., avoid, chattering between the first and the second configurations. For example, if the input voltage measurements are below the first voltage level threshold, then the switch circuitry 118 is configured to be set to the second configuration from the first configuration and the voltage boost system 102 provides a boosted voltage output at the output conductors 102B. When the input voltage measurements rise above a second threshold, the switch circuitry 118 is configured to be set to the first configuration from the second configuration and the voltage boost system 102 provides an unboosted voltage at the output conductors 102B. In some embodiments, the first and second thresholds are equal; that is, the threshold used to compare input voltage measurements is the same.

Voltage boost system 102 outputs the boosted or unboosted voltage to the output conductors 102B, and this is configured to provide the boosted or unboosted voltage to a first end (or voltage boost system end) of power cable 120. In some embodiments, the length of power cable 120 can be very large and extend hundreds of feet long. Although not shown in FIG. 1, voltage boost system 102 can connect to multiple power cables 120 that are each connected to multiple radios 116 at the second end of the power cables. The radio can be located at the top of a cell tower and configured to communicate radio frequency (RF) signals to user devices in the radio system 100 via one or more antennas communicatively coupled to the radio.

Optionally, system 100 includes second switch circuitry 130 coupled to the outputs of the AC/DC power supply 104 and batter(ies) 106. In this exemplary embodiment, optional second switch circuitry 130 is configured to switch between the outputs of non-battery power source 104 and batter(ies) 106, and provide DC power, at the input conductors 102A, to the voltage boost system 102. Thus, with this option, only one of the AC/DC power supply 104 and the batter(ies) 106 is configured to be electrically coupled to the input conductors 102A at any one time. The second switch circuitry 130 is optionally configured to also allow the AC/DC power supply 104 to charge the batter(ies) 106.

When second switch circuitry 130 detects that DC voltage is provided by AC/DC power supply 104 is below a threshold voltage level, second switch circuitry 130 switches to provide the DC power from batter(ies) 106, instead of from the AC/DC power supply 104, to voltage boost system 102. When second switch circuitry 130 detects that DC voltage is provided by AC/DC power supply 104 is above a threshold voltage level, second switch circuitry 130 switches to provide the DC power from the AC/DC power supply 104, instead of from batter(ies) 106, to voltage boost system 102. Optionally, the second switch circuitry 130 may include voltage measurement circuitry similar to that described elsewhere herein. Further, the second switch circuitry may use one or more threshold levels as described elsewhere herein.

Second switch circuitry 130 is further configured to send a signal (e.g. a first signal S1) to the voltage boost system 102, e.g., to the processing circuitry 112, indicating the source of DC power (e.g., the AC/DC power supply 104 or batter(ies) 106) provided by the second switch circuitry 130. For example, the signal may indicate a type of DC power source, or a voltage level. Based upon the signal, the switch circuitry 118 is configured to be in the first or second configuration by the processing circuitry 112, e.g. by sending a second signal S2 to switch circuitry 118. If in the second configuration, optionally, the voltage boost circuitry 114 is activated, e.g., by a third signal S3 sent from the processing circuitry 114. If in the first configuration, optionally, the voltage boost circuitry 114 is deactivated or placed in a low power consumption mode. When deactivated, the voltage boost circuitry 114 cannot provide voltage boosting. In the low power consumption mode, the voltage boost circuitry 114 does not perform voltage boosting but may perform other operations such as providing data about its operation, e.g., input and output voltage levels, etc. When, activated, the voltage boost circuitry 114 can provide voltage boosting.

FIG. 2 illustrates a block diagram of one embodiment of a voltage boost system including a single pole double throw (SPDT) switch. Voltage boost system 202 functions similarly to voltage boost system 102 described above with respect to FIG. 1. That is, voltage boost system 202 is configured to receive a DC voltage from a DC power source, such as an AC/DC power supply 104 or the batter(ies) 106. Voltage boost system 202 is also configured to output a unboosted voltage when the DC power source is the primary power source, such as the AC/DC power supply, and to output a boosted voltage when the DC power source is the batter(ies) 106. Voltage boost system 202 is further configured to output the unboosted or boosted voltage to a radio as described above.

In FIG. 2, the processing circuitry 212 comprises optional voltage measurement circuitry 220 and a bypass conductor 230. The optional voltage measurement circuitry 220 is configured to measure the voltage across the input of voltage boost system 202; alternatively, the processing circuitry 212 is configured to receive a signal from an external component (external voltage measurement circuitry or the second switch circuitry described elsewhere herein). Processing circuitry 212 determines the configuration of the switch circuitry 218 based upon voltage measurements or a received signal indicating type of source of DC power (e.g., batter(ies) 106 or AC/DC power supply 104) as described elsewhere herein. The processing circuitry 212 is configured to set the configuration of the switch circuitry 218 and voltage boost circuitry 214 based upon such voltage measurements or received signal as further described elsewhere herein.

Specifically, in the embodiment shown in FIG. 2, switch circuitry 218 includes a SPDT switch coupled to the output of voltage boost circuitry 214. One input is connected to the output of voltage boost circuitry 214, while the other input is connected to a bypass conductor 230. When processing circuitry 212 determines that the DC power source providing DC voltage Vin is the AC/DC power supply, it switches the SPDT switch as shown in FIG. 2 and connects the output 234 of voltage boost system 202 to the bypass conductor 230. This configuration creates a closed circuit between the Vin input connection and the output 234 of voltage boost system 202 so that the unboosted voltage Vin is provided to a power cable. Thus, the voltage at the output conductors 202B is substantially equal to the voltage at input conductors 202A. Meanwhile, the output 236 of voltage boost circuitry 214 is left open, creating an open circuit and preventing current from flowing through to the output of voltage boost system 202. Thus, processing circuitry 212 can deactivate voltage boost circuitry 214 while in this configuration to reduce operation costs and generate boost voltage only when the voltage falls below the input voltage threshold.

Alternatively, processing circuitry 212 switches the SPDT switch 218A so that the output 234 of voltage boost system 202 connects to the input corresponding to the output 236 of voltage boost circuitry 214. This creates a closed circuit with Vout connection 234 and the output 236 of voltage boost circuitry 214, which when activated, enables an effective output voltage equal to the input voltage plus an additional DC voltage boost generated by voltage boost circuitry 214. In some embodiments, other electrical components (e.g., filters, overcurrent protection circuitry, circuit breakers, or surge arrestor circuitry) may be present in voltage boost system 202, for example, at Vout connection 234. Optionally, additional switch circuitry may be coupled to the input of voltage boost circuitry 114 (not shown in FIG. 2). In this embodiment, the switch circuitry may configure the Vin connection 232 to the bypass conductor 230 when voltage boost circuitry 214 is not in use, and may configure the Vin connection 232 to the input of voltage boost circuitry 214 when voltage boost circuitry 214 is activated.

FIG. 3 illustrates a block diagram of one embodiment of voltage boost system in which the switch circuitry includes a single pole single throw (SPST) switch and a diode. Voltage boost system 302 functions similarly to its counterparts described in FIGS. 1-2 with some modifications described further below.

In FIG. 3, processing circuitry 312 is coupled to isolated voltage boost circuitry 314 optionally through at least one of an enable and trim connection. Isolated voltage boost circuitry means the input(s) of the voltage boost circuitry are physically and/or electrically isolated from the output(s) of the voltage boost circuitry, for example, by a transformer electrically coupled between the input(s) and output(s). Though FIG. 3 explicitly recites an isolated voltage boost circuitry, voltage boost circuitry 314 can be implemented using other types of boost circuits as well. Likewise, the embodiments described in FIGS. 1 and 2 can be implemented using isolated boost circuitry. In some embodiments, isolated voltage boost circuitry 314 includes an isolated DC-DC converter. When isolated voltage boost circuitry 314 includes an enable input (EN), processing circuitry 312 optionally is configured to: (a) send a first control signal to the enable input activating voltage boost circuitry 314 to generate a boosted DC voltage when the processing circuitry 312 determines that DC power is supplied from the batter(ies) 106, and (b) send second control signal to the enable input to activate the voltage boost circuitry 314 when the processing circuitry determines that the DC power is supplied from the AC/DC power supply 104. Thus, the voltage at the output conductors 302B is substantially equal to the voltage at input conductors 302A. In some embodiments, an isolated output voltage (e.g. –6V) is generated and stacked on the input voltage (e.g. –48V) to get a boosted voltage (e.g. –54 VDC). When processing circuitry 312 determines that the DC power is provided from the AC/DC power supply 104 (e.g. via optional voltage measurement circuitry 310), processing circuitry 312 is configured to send a first control signal deactivating (or placing in a low power consumption mode) isolated voltage boost circuitry 314 via the enable connection.

When isolated voltage boost circuitry 314 includes a trim input (TRIM), processing circuitry 312 is optionally configured to set the boosted DC voltage generated by isolated voltage boost circuitry 314 by providing to the trim input a value of the amount an input voltage is boosted (to result in the boosted output voltage) or a boosted output voltage value. If the voltage boost generated by isolated voltage boost circuitry 314 is insufficient, for example, processing circuitry 312 is configured to send a first control signal via the trim input that configures voltage boost circuitry 314 to generate an increased voltage boost, and vice-versa.

Processing circuitry 312 determines the configuration of the switch circuitry 318 based upon voltage measurements or a received signal indicating type of source of DC power (e.g., batter(ies) 106 or AC/DC power supply 104) as described elsewhere herein. The processing circuitry 212 is configured to set the configuration of the switch circuitry 318 and isolated voltage boost circuitry 314 based upon such voltage measurements or received signal as further described elsewhere herein.

In the embodiment shown in FIG. 3, switch circuitry 318 includes a single pole single throw switch (e.g., a field effect transistor switch) electrically coupled to a diode D1. Isolated voltage boost circuitry 314 also differs from voltage boost circuitry 214 in that it is isolated voltage boost circuitry, and thus has an extra input (V+). The input V+ is configured to receive the DC voltage provided from Vin. If processing circuitry 312 determines that the DC voltage source is provided by the batter(ies) 106 instead of the AC/DC power supply (e.g., that the input voltage measurements are below a threshold), then processing circuitry 312 turns on the switch circuitry 318. Optionally, the processing circuitry 312 activates the isolated voltage boost circuitry 314. The voltage at Vin is boosted, the boosted voltage is provided at V–, the processing circuitry 312 causes SPST S1 to be open, and the diode D1 is reversed biased (i.e., creating an open circuit or high impedance) by the boosted voltage at a cathode of diode D1 and the DC voltage of the batteries at an anode of the diode D1. As a result, the boosted voltage is provided to the output conductors 302B.

When processing circuitry 312 determines that the DC power is provided by the AC/DC power supply 104, the processing circuitry turns off the switch circuitry 318 and optionally does not activate (or optionally sets to the low power consumption mode) the voltage boost circuitry 314. The processing circuitry 312 causes SPST S1 to be open. Diode D1 is forward biased (i.e., creating a low impedance) by DC voltage of the AC/DC power supply 104 at input V+. Thus, DC voltage at the output conductors 302B is the same as the DC voltage of the AC/DC power supply 104 at the input conductors 302A. For purposes of clarity, although the optional trim and enable inputs are described with respect to an isolated voltage boost circuitry 314, the optional trim and enable inputs may be utilized with respect to other voltage boost circuitry, e.g., as illustrated in FIGS. 1 and 2.

Figure 4:
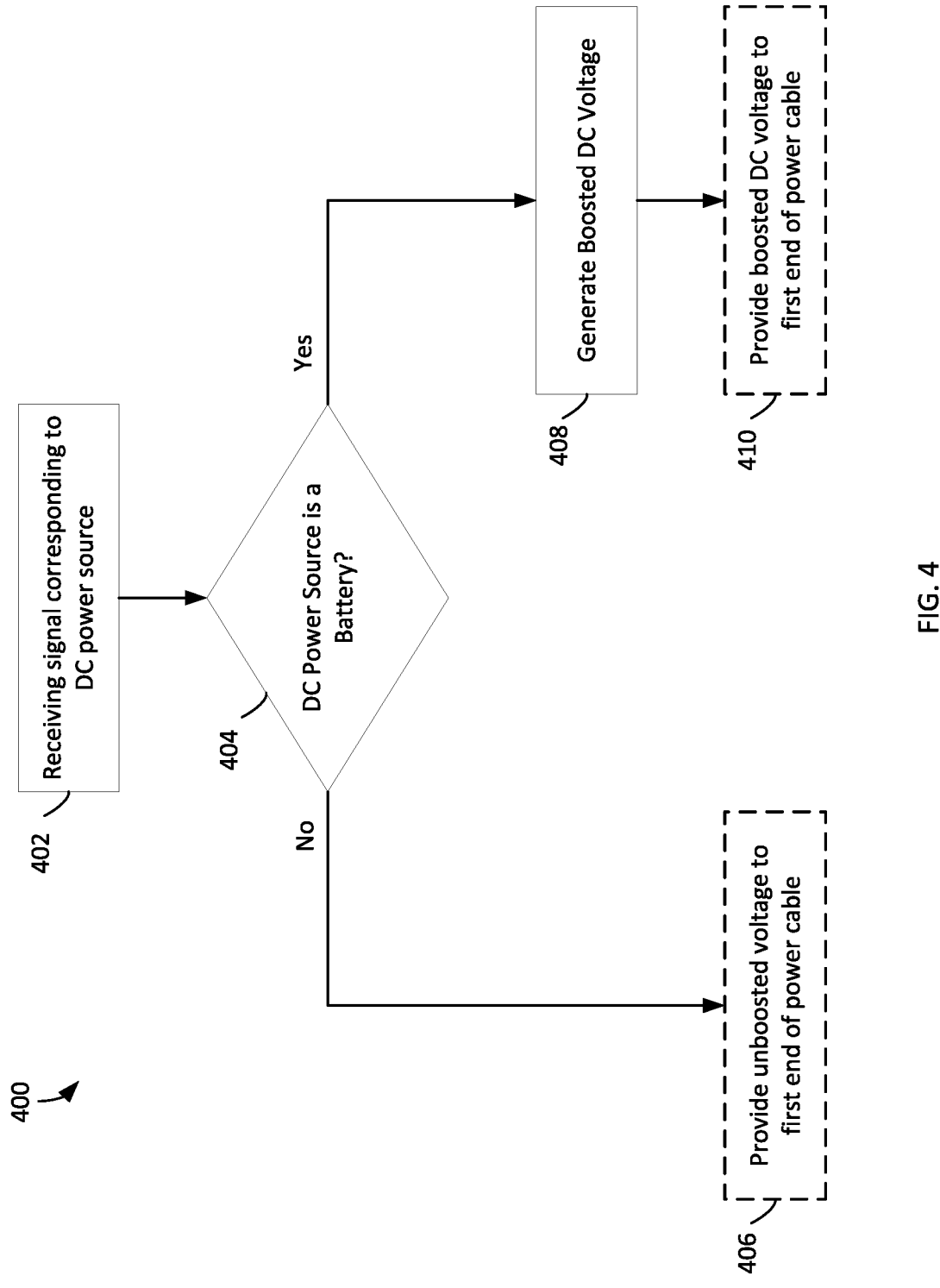
FIG. 4 illustrates a flow diagram of one embodiment of a method of boosting a DC voltage when the DC voltage is provided by a battery.

FIG. 4 illustrates a flow diagram of one embodiment of a method of boosting a DC voltage when the DC voltage is provided by batter(ies). Method 400 may be implemented via the techniques described with respect to FIGS. 1-3, but may be implemented via other techniques as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

In block 402, receive a signal corresponding to a DC power source. The signal may indicate a DC voltage level at input conductors of a voltage boost system or may indicate a type of DC power source providing the DC voltage at the input conductors. Optionally, this can include measuring a DC voltage of a DC power source, for example, through voltage measurement circuitry. Optionally, the DC voltage can be measured at an input of a voltage boost circuit. The voltage boost circuit may form part of the voltage boost system as described in FIGS. 1-3 for a radio system. Optionally, the signal can be a signal from e.g., second switch circuitry.

In block 404, determine whether the DC power source is a battery based upon the received signal. If the DC power source is not a battery, then in block 406, provide an unboosted voltage to a first end of a power cable. The unboosted voltage corresponds to the voltage provided by the AC/DC power supply, which in some embodiments, is the primary power supply that generates voltage for the radio system.

If the DC power source is a battery, then in block 408, generate a boosted voltage. In some embodiments, the boosted voltage is a fixed, predetermined value, while in other embodiments, the boosted voltage is generated based on the resistance and current of the power cable. The boosted voltage is configured to be provided to a radio through a power cable. In some embodiments, the radio can include a remote antenna unit, remote radio unit, or activate antenna unit of a radio distribution system. In block 410, optionally provide the boosted voltage to the first end of the power cable.

Method 400 can include additional optional steps as well. For example, method 400 can optionally provide the DC voltage to powered equipment (e.g., baseband unit) located proximately to a voltage boost system in addition to providing DC voltage to the radio. Also, method 400 may deactivate voltage boost circuitry (or set the voltage boost circuitry to operate in a low power consumption mode) when the input voltage is provided by a non-battery power supply (e.g., when the input voltage is above a second threshold voltage level), and may activate the voltage boost circuitry when the input voltage is provided from a non-battery power supply (e.g., when the input voltage is below the first threshold voltage level). In some embodiments, the first and second threshold levels are equal.

Figure 5:
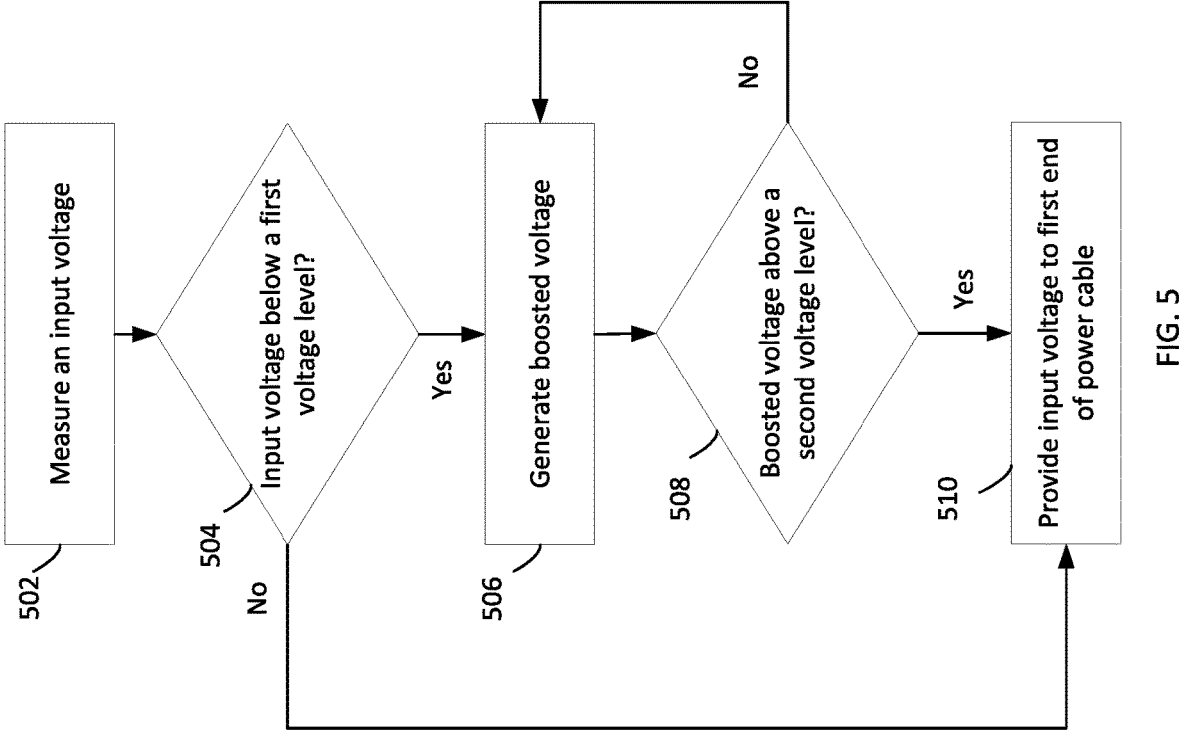
FIG. 5 illustrates a flow diagram of one embodiment of a method of boosting an input DC voltage based on whether the input voltage is below a threshold value.

FIG. 5 illustrates one embodiment of a method 500 for boosting an input voltage based on whether the input voltage is below a threshold value. Similar to FIG. 4, FIG. 5 may be implemented using the techniques described with respect to FIGS. 1-3 but may be implemented other ways as well.

Method 500 begins at block 502, measure an input DC voltage such as the input to a voltage boost system described above. At block 504, determine whether the measured input voltage is below a first threshold level. If not, then the input voltage can be provided to a first end of a power cable at block 510.

If the input voltage is below a first threshold level, then at block 506, generate a boosted voltage. In some embodiments, the boosted voltage can be a fixed, predetermined voltage boost, such as –6 VDC. In other embodiments, the boosted voltage can by adjusted based on a measured current and resistance of a power cable. At block 508, determine whether the boosted voltage is above a second voltage level, which corresponds to a voltage that is supplied by a primary (non-battery) power source. If not, then continue to generate a boosted voltage at block 506 and reassess at block 508 whether the boosted voltage is above the second threshold level. When the boosted voltage is above the second voltage level, then at block 510, provide the input voltage to the first end of the power cable. In some embodiments, the second voltage level is higher than the first voltage level. However, in other embodiments, the first and second voltage level are equal.

The processing functions described herein may be performed by one or more microprocessors, microcontrollers, digital signal processing (DSP) elements, application-specific integrated circuits (ASICs), and/or field programmable gate arrays (FPGAs). Processing circuitry (e.g., control logic circuitry) may include or function with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory functions (e.g. memory circuitry) described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to control logic circuitry, and executed by the control logic circuitry. Generally, program modules or applications include routines, programs, objects, data components, data structures, algorithms, and the like, which perform particular tasks or implement particular abstract data types.

The terms "about" or "substantially" mean that the value or parameter specified may be somewhat altered, as long as the alteration does not result in nonconformance of the process or structure to the illustrated embodiment from the perspective of one having ordinary skill in the art. For instance, unless otherwise indicated, a numerical quantity modified by the term "substantially" can be altered to within ±20% of the specified value. Finally, the term "exemplary" merely indicates the accompanying description is used as an example, rather than implying an ideal, essential, or preferable feature of the invention.

EXAMPLE EMBODIMENTS

Example 1 includes a system, comprising: input conductors configured to receive an input direct current (DC) voltage from one of a non-battery DC power source and at least one battery; output conductors configured to provide an output DC voltage to a first end of a power cable electrically coupled to a radio; processing circuitry coupled to the input conductors; voltage boost circuitry electrically coupled to the input conductors, and configured to generate a boosted DC voltage from the received DC voltage; and first switch circuitry electrically coupled to the voltage boost circuitry, wherein in a first configuration of the first switch circuitry an unboosted DC voltage is provided at the output conductors, wherein the unboosted voltage is substantially equal to the input DC voltage, and wherein in a second configuration of the first switch circuitry the boosted DC voltage is provided at the output conductors, wherein the processing circuitry is further configured to receive a signal indicative of whether the input DC voltage received by the input conductors is from the at least one battery or is from the non-battery DC power source, and configured to configure the first switch circuitry in the first configuration when the signal indicates that the input DC voltage is from the non-battery DC power source, and to configure the first switch circuitry in the second configuration when the input DC voltage is from the at least one battery.

Example 2 includes the system of Example 1, wherein the processing circuitry is electrically coupled to the voltage boost circuitry and is further configured to activate the voltage boost circuitry when the input DC voltage is provided from the at least one battery.

Example 3 includes the system of any of Examples 1-2, wherein the processing circuitry is electrically coupled to the voltage boost circuitry and wherein the voltage boost circuitry is further is configured to generate a boosted DC voltage at the output conductors that varies based upon a resistance of the power cable and a measured current flowing through the output conductors.

Example 4 includes the system of any of Examples 1-3, wherein the processing circuitry is electrically coupled to the voltage boost circuitry and is further configured to disable voltage boosting functionality of the voltage boost circuitry when the input DC voltage is provided from the non-battery DC power source.

Example 5 includes the system of any of Examples 1-4, wherein the voltage boost circuitry is configured to generate a predetermined boosted DC voltage at the output conductors.

Example 6 includes the system of any of Examples 1-5, wherein the signal comprises an electrical parameter indicative of a DC voltage level at the input conductors, wherein the processing circuitry is configured to configure the first switch circuitry in the second configuration when a level of the electrical parameter is lower than a first threshold level, and wherein the processing circuitry is configured to configure the first switch circuitry in the first configuration when the level of the electrical parameter is higher a second threshold level.

Example 7 includes the system of Example 6, wherein the first threshold level and the second threshold level are equal.

Example 8 includes the system of any of Examples 1-7, wherein the processing circuitry is configured to receive the signal from second switch circuitry electrically coupled to the processing circuitry.

Example 9 includes the system of any of Examples 1-8, further comprising measurement circuitry electrically coupled to or included in the processing circuitry, wherein the measurement circuitry is configured to measure an electrical parameter indicative of DC voltage at the input conductors, and wherein the processing circuitry is configured to configure the first switch circuitry in the second configuration when the measured electrical parameter is lower than a first threshold level, and wherein the processing circuitry is configured to configure the first switch circuitry in the first configuration when the measured electrical parameter is higher than the second threshold level.

Example 10 includes the system of Example 9, wherein the measured electrical parameter is a measured DC voltage at the input conductors.

Example 11 includes the system of Example 10, wherein the processing circuitry is configured to activate the voltage boost circuitry when the measured DC voltage is lower than the first threshold level, and wherein the processing circuitry is configured to disable voltage boosting functionality of the voltage boost circuitry when the measured DC voltage is higher than a second threshold level.

Example 12 includes the system of Example 11, wherein the first threshold level and second threshold level are equal.

Example 13 includes the system of any of Examples 1-12, wherein the voltage boost circuitry comprises an isolated voltage boost circuit.

Example 14 includes a method, comprising: measuring a direct current (DC) voltage of a DC power source; determining whether the DC power source is a battery based upon the measured DC voltage; upon determining that the DC power source is a battery, then generating a boosted DC voltage which is configured to be provided to a first end of a power cable electrically coupled to a radio.

Example 15 includes the method of Example 14, further comprising providing an unboosted DC voltage to the power cable when the DC voltage is not provided by the battery.

Example 16 includes the method of any of Examples 14-15, wherein generating a boosted DC voltage further comprises generating a predetermined boosted DC voltage.

Example 17 includes the method of any of Examples 14-16, wherein generating a boosted DC voltage further comprises generating the boosted DC voltage based upon a resistance of the power cable and a measured current flowing through the power cable.

Example 18 includes the method of any of Examples 14-17, wherein upon determining that the DC power source is a battery further comprises determining whether the DC voltage is lower than a first threshold, and generating a boosted DC voltage when the DC voltage is lower than the first threshold, and providing an unboosted DC voltage when the DC voltage is higher than a second threshold.

Example 19 includes a program product comprising a non-transitory processor readable medium on which program instructions are embodied, wherein the program instructions are configured, when executed by at least one processor, to cause the at least one processor to: receive a first signal indicative of whether a direct current (DC) voltage at an input of a voltage boost system is provided from at least one battery or is provided from a non-battery DC power source; and send a second signal to switch circuitry coupled to the at least one processor based on the received first signal, wherein the second signal is configured to configure the switch circuitry so that a boosted DC voltage output is provided to a radio through a power cable when the first signal indicates that the DC voltage is provided by the at least one battery, and an unboosted DC voltage output is provided to the radio through the power cable when the first signal indicates that the DC voltage is provided by the non-battery DC power source.

Example 20 includes the program product of Example 19, wherein the first signal comprises an electrical parameter indicative of a DC voltage level at the input of the voltage boost system; and wherein the program instructions are configured, when executed by the at least one processor, to further cause the at least one processor to: determine whether the electrical parameter is less than a first threshold level; and upon determining that the electrical parameter is less than the first threshold level, then send the second signal to the switch circuitry configuring the switch circuitry so that the boosted DC voltage output is provided to the radio.

Example 21 includes the program product of Example 20, wherein the program instructions are configured, when executed by the at least one processor, to further cause the at least one processor to: upon determining that the electrical parameter is greater than a second threshold level, then send the second signal to the switch circuitry configuring the switch circuitry so that the unboosted DC voltage output is provided to the radio.

Example 22 includes the program product of Example 21, wherein the first threshold level and the second threshold level are equal.

Example 23 includes the program product of any of Examples 20-22, wherein the electrical parameter is a measured DC voltage.

Example 24 includes the program product of any of Examples 19-23, wherein the program instructions are configured, when executed by the at least one processor, to further cause the at least one processor to: when the first signal indicates that the DC voltage is provided by the at least one battery, send a third signal activating voltage boost circuitry coupled to the at least one processor to generate the boosted DC voltage output; and when the first signal indicates that the DC voltage is provided by the non-battery DC power source, send the third signal disabling voltage boost functionality of the voltage boost circuitry.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system, comprising:
   input conductors configured to receive an input direct current (DC) voltage from one of a non-battery DC power source and a battery;
   output conductors electrically coupled to a radio through power conductors including a first end and a radio end, wherein the radio end is electrically coupled to and is by the radio;
   processing circuitry coupled to the input conductors;
   voltage boost circuitry electrically coupled to the input conductors, and configured to generate a boosted DC voltage from the input DC voltage; and
   first switch circuitry electrically coupled to the voltage boost circuitry, wherein in a first configuration of the first switch circuitry is configured to provide an unboosted DC voltage to the first end of the power conductors through the output conductors, wherein the unboosted DC voltage is substantially equal to the input DC voltage, and wherein in a second configuration of the first switch circuitry the first switch circuitry is configured to provide the boosted DC voltage to the first end of the power conductors through the output conductors,
   wherein the processing circuitry is further configured to: (a) receive a signal indicative of DC power source, (b) using the signal, determine whether the DC power source is the battery; (c) determining that the DC power source is not the battery, then configure the first switch circuitry in the first configuration, and (d) determining that the DC power source is the battery, then configure the first switch circuitry in the second configuration.

2. The system of claim 1, wherein the processing circuitry is electrically coupled to the voltage boost circuitry and is further configured to activate the voltage boost circuitry when the input DC voltage is provided from the battery.

3. The system of claim 1, wherein the processing circuitry is electrically coupled to the voltage boost circuitry and wherein the voltage boost circuitry is further is configured to generate the boosted DC voltage at the output conductors that varies based upon a resistance of the power conductors and a measured current flowing through the output conductors.

4. The system of claim 1, wherein the processing circuitry is electrically coupled to the voltage boost circuitry and is further configured to disable voltage boosting functionality of the voltage boost circuitry when the input DC voltage is provided from the non-battery DC power source.

5. The system of claim 1, wherein the voltage boost circuitry is configured to generate a predetermined boosted DC voltage at the output conductors.

6. The system of claim 1, further comprising measurement circuitry electrically coupled to or included in the processing circuitry, wherein the measurement circuitry is configured to measure an electrical parameter indicative of a DC voltage level at the input conductors, wherein the signal comprises the electrical parameter indicative of the DC voltage level at the input conductors, wherein using the signal, determine whether the DC power source is the battery comprises using a value of the electrical parameter, determine whether the DC power source is the battery.

7. The system of claim 1, wherein the processing circuitry is configured to receive the signal from second switch circuitry electrically coupled to the processing circuitry.

8. The system of claim 1, wherein the voltage boost circuitry comprises an isolated voltage boost circuit.

9. A program product comprising a non-transitory processor readable medium on which program instructions are embodied, wherein the program instructions are configured, when executed by at least one processor, to cause the at least one processor to perform a process, the process comprising:
   receiving a signal indicative of DC power source providing DC power to a radio through power conductors including a first end and a radio end, wherein the radio end is electrically coupled to and is by the radio;
   using the signal, determining whether the DC power source is a battery;
   determining that the DC power source is not the battery, then causing an unboosted DC voltage to be provided to the first end of the power conductors; and
   determining that the DC power source is the battery, then causing a boosted DC voltage to be provided to the first end of the power conductors.

10. The program product of claim 9, wherein the signal comprises an electrical parameter indicative of a DC voltage level at an input of a voltage boost system; and wherein using the signal, determine whether the DC power source is the battery comprises using a value of the electrical parameter, determine whether the DC power source is the battery:
   determine whether the electrical parameter is less than a first threshold level; and
   determining that the electrical parameter is less than the first threshold level, then cause the boosted DC voltage to be provided to the first end of the power conductors.

11. The program product of claim 10, wherein the electrical parameter is a measured DC voltage.

12. The program product of claim 9, wherein
   determining that the DC power source is the battery, then causing the boosted DC voltage to be provided to the first end of the power conductors further comprises activating a voltage boost functionality of voltage boost circuitry to generate the boosted DC voltage; and
   wherein determining that the DC power source is not the battery, then causing the unboosted DC voltage to be provided to the first end of the power conductors further comprises disabling the voltage boost func-
tionality of the voltage boost circuitry.

* * * * *